(12) United States Patent
Kim et al.

(10) Patent No.: US 12,609,111 B2
(45) Date of Patent: Apr. 21, 2026

(54) CLUSTERING AND MINING ACCENTED SPEECH FOR INCLUSIVE AND FAIR SPEECH RECOGNITION

(71) Applicant: Google LLC, Mountain View, CA (US)

(72) Inventors: Jaeyoung Kim, Cupertino, CA (US); Han Lu, Redmond, WA (US); Soheil Khorram, Redwood City, CA (US); Anshuman Tripathi, Mountain View, CA (US); Qian Zhang, Mountain View, CA (US); Hasim Sak, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 143 days.

(21) Appl. No.: 18/587,860

(22) Filed: Feb. 26, 2024

(65) Prior Publication Data

US 2024/0290322 A1 Aug. 29, 2024

Related U.S. Application Data

(60) Provisional application No. 63/487,569, filed on Feb. 28, 2023.

(51) Int. Cl.
G10L 15/06 (2013.01)
(52) U.S. Cl.
CPC .................................. G10L 15/063 (2013.01)
(58) Field of Classification Search
CPC ..... G10L 3/045; G10L 15/063; G10L 15/005; G10L 15/16; G10L 15/02; G06N 3/044; G06N 3/08
See application file for complete search history.

(56) References Cited

U.S. PATENT DOCUMENTS

| | | | | |
|---|---|---|---|---|
| 7,136,816 B1 * | 11/2006 | Strom | ..................... | G10L 13/10 |
| | | | | 704/260 |
| 9,009,049 B2 * | 4/2015 | Liu | ......................... | G10L 15/32 |
| | | | | 704/251 |
| 9,734,819 B2 * | 8/2017 | Gray | ....................... | G10L 15/22 |
| 10,296,959 B1 * | 5/2019 | Chernikhova | ..... | G06Q 30/0631 |

(Continued)

OTHER PUBLICATIONS

Gao Qiang et al: "An End-to-End Speech Accent Recognition Method Based on Hybrid CTC/Attention Transformer ASR", ICASSP 2021-2021 IEEE International Conference on Acoustics, Speech and Signal Processing (ICASSP), IEEE, Jun. 6, 2021 (Jun. 6, 2021), pp. 7253-7257, XP033954506.

(Continued)

*Primary Examiner* — Jakieda R Jackson
(74) *Attorney, Agent, or Firm* — Honigman LLP; Brett A. Krueger; Grant Griffith

(57) ABSTRACT

A method of training an accent recognition model includes receiving a corpus of training utterances spoken across various accents, each training utterance in the corpus including training audio features characterizing the training utterance, and executing a training process to train the accent recognition model on the corpus of training utterances to teach the accent recognition model to learn how to predict accent representations from the training audio features. The accent recognition model includes one or more strided convolution layers, a stack of multi-headed attention layers, and a pooling layer configured to generate a corresponding accent representation.

28 Claims, 10 Drawing Sheets

(56)                References Cited

U.S. PATENT DOCUMENTS

| | | | | |
|---|---|---|---|---|
| 11,062,694 | B2 * | 7/2021 | Nicolis | G10L 13/10 |
| 11,176,724 | B1 * | 11/2021 | Sinha | G10L 21/10 |
| 11,521,639 | B1 * | 12/2022 | Shon | G06N 3/0895 |
| 11,551,393 | B2 * | 1/2023 | Shang | G10L 21/10 |
| 11,600,284 | B2 * | 3/2023 | Pearson | G06N 3/08 |
| 11,854,538 | B1 * | 12/2023 | Rozgic | G10L 25/63 |
| 11,922,963 | B2 * | 3/2024 | Wang | G10L 25/30 |
| 12,046,236 | B2 * | 7/2024 | Kuo | G10L 15/04 |
| 12,266,346 | B2 * | 4/2025 | Chong | G10L 15/063 |
| 12,412,588 | B2 * | 9/2025 | Huffman | G10L 15/22 |
| 2004/0056907 | A1 * | 3/2004 | Sharma | G10L 15/24 |
| | | | | 704/E15.041 |
| 2010/0082326 | A1 * | 4/2010 | Bangalore | G10L 13/10 |
| | | | | 704/3 |
| 2010/0125459 | A1 * | 5/2010 | Itoh | G10L 13/08 |
| | | | | 704/E13.011 |
| 2016/0351074 | A1 * | 12/2016 | Paul | A61B 5/4803 |
| 2017/0148433 | A1 * | 5/2017 | Catanzaro | G06N 3/044 |
| 2018/0247636 | A1 * | 8/2018 | Arik | G10L 25/30 |
| 2018/0277100 | A1 * | 9/2018 | Cassagne | G09B 5/04 |
| 2018/0342258 | A1 * | 11/2018 | Huffman | G10L 21/013 |
| 2019/0130903 | A1 * | 5/2019 | Sriram | G10L 15/063 |
| 2019/0341052 | A1 * | 11/2019 | Allibhai | G06N 3/045 |
| 2020/0035222 | A1 * | 1/2020 | Sypniewski | G06N 3/044 |
| 2020/0310761 | A1 * | 10/2020 | Rossi | H03M 7/18 |
| 2020/0314490 | A1 * | 10/2020 | el Kaliouby | H04N 21/44218 |
| 2021/0082402 | A1 * | 3/2021 | Sun | G10L 15/07 |
| 2021/0233513 | A1 * | 7/2021 | Su | G10L 15/22 |
| 2021/0312294 | A1 * | 10/2021 | Kurata | G06F 17/18 |
| 2021/0365773 | A1 * | 11/2021 | Subramanian | G06N 3/08 |
| 2022/0012848 | A1 * | 1/2022 | Ranftl | G06N 3/045 |
| 2022/0270509 | A1 * | 8/2022 | Josephson | G09B 5/065 |
| 2022/0319501 | A1 * | 10/2022 | Kim | G06N 3/0464 |
| 2024/0071064 | A1 * | 2/2024 | Chung | G06V 20/58 |
| 2024/0153508 | A1 * | 5/2024 | Moritz | G06F 40/169 |

OTHER PUBLICATIONS

Mohamed Abdelrahman et al: "Self-Supervised Speech Representation Learning: A Review", IEEE Journal of Selected Topics in Signal Processing, IEEE, US, vol. 16, No. 6, Sep. 15, 2022 (Sep. 15, 2022), pp. 1179-1210, XP011923928.
International Search Report and Written Opinion issued in related PCT Application No. PCT/US2024/017357 dated Feb. 26, 2024.

* cited by examiner

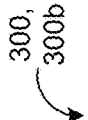
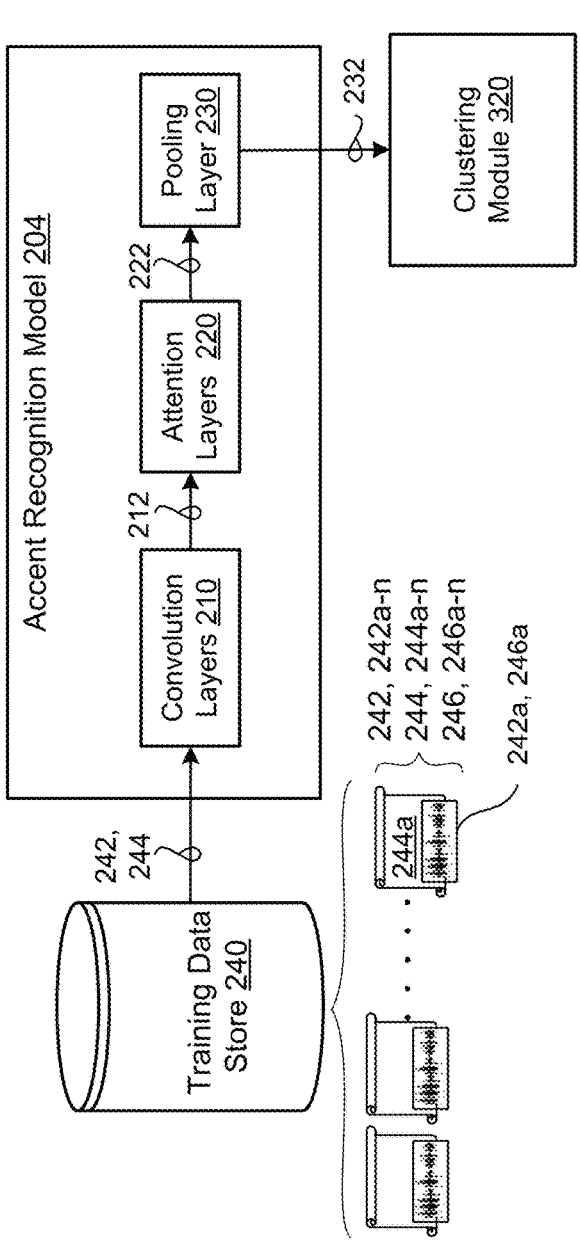
FIG. 3B

600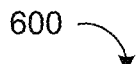

Receiving a corpus of training utterances spoken across various accents, each training utterance in the corpus including training audio features characterizing the training utterance

602

Executing a training process to train an accent recognition model on the corpus of training utterances to teach the accent recognition model to learn how to predict accent representations from the training audio features, the accent recognition model including one or more strided convolutional layers configured to sub-sample the training audio features of each training utterance and output a strided convolution output, a stack of multi-head attention layers configured to receive each strided convolution output from the strided convolutional layers, and a pooling layer configured to pool, from a last multi-head attention layer in the stack of multi-head attention layers, an output for each training utterance across time to generate a corresponding accent representation

CLUSTERING AND MINING ACCENTED SPEECH FOR INCLUSIVE AND FAIR SPEECH RECOGNITION

CROSS REFERENCE TO RELATED APPLICATIONS

This U.S. patent application claims priority under 35 U.S.C. § 119(e) to U.S. Provisional Application No. 63/487,569, filed on Feb. 28, 2023. The disclosure of this prior application is considered part of the disclosure of this application and is hereby incorporated by reference in its entirety.

TECHNICAL FIELD

This disclosure relates to clustering and mining accented speech for inclusive and fair speech recognition.

BACKGROUND

Automated speech recognition (ASR) systems have evolved from multiple models where each model had a dedicated purpose to integrated models where a single neural network is used to directly map an audio waveform (i.e., input sequence) to an output sentence (i.e., output sequence). This integration has resulted in a sequence-to-sequence approach, which generates a sequence of words (or graphemes) when given a sequence of audio features. With an integrated structure, all components of a model may be trained jointly as a single end-to-end (E2E) neural network. Here, an E2E model refers to a model whose architecture is constructed entirely of a neural network. A fully neural network functions without external and/or manually designed components (e.g., finite state transducers, a lexicon, or text normalization modules). Additionally, when training E2E models, these models generally do not require bootstrapping from decision trees or time alignments from a separate system. These E2E automatic speech recognition (ASR) systems have made tremendous progress, surpassing conventional ASR systems in several common benchmarks including word error rates (WER). Typically, ASR systems are trained on large data sets (i.e., more than tens of thousands of hours of speech data). However, the distribution of speech data used for training ASR systems is often biased toward common accents or typical speech patterns. This bias may further result in the ASR systems performing poorly when recognizing atypical accented speech.

SUMMARY

One aspect of the disclosure provides a computer-implemented method of clustering and mining accented speech for inclusive and fair speech recognition in an automatic speech recognition (ASR) system. The computer-implemented method when executed on data processing hardware causes the data processing hardware to perform operations that include receiving a corpus of training utterances spoken across various accents. Each training utterance in the corpus includes training audio features characterizing the training utterance. The operations also include executing a training process to train an accent recognition model on the corpus of training utterances to teach the accent recognition model to learn how to predict accent representations from the training audio features. The accent recognition model includes one or more strided convolution layers, a stack of multi-headed attention layers, and a pooling layer. The one or more strided convolutional layers are configured to sub-sample the training audio features of each training utterance and output a strided convolution output. The stack of multi-head attention layers are configured to receive each strided convolution output from the strided convolutional layers. The pooling layer is configured to pool, from a last multi-head attention layer in the stack of multi-head attention layers, an output for each training utterance across time to generate a corresponding accent representation.

Implementations of the disclosure may include one or more of the following optional features. In some implementations, the operations further include, prior to training the accent recognition model, pretraining the accent recognition model by training an end-to-end speech recognition model on a set of supervised pretraining samples. Each supervised pretraining sample in the set of supervised pretraining samples includes audio data characterizing an utterance paired with a ground-truth transcription of the utterance. Here, the end-to-end speech recognition model includes an audio encoder and a decoder, and the pretrained accent recognition model is initialized from the audio encoder after training the end-to-end speech recognition model. In these implementations, the end-to-end speech recognition model may include a transducer-based architecture. Additionally or alternatively, the audio encoder of the end-to-end speech recognition model includes a same architecture as the accent recognition model. The set of supervised pretraining samples may contain utterances spanning various accents. In some examples, the operations further include, prior to training the accent recognition model, pretraining the accent recognition model on a set of unsupervised pretraining samples. In these examples, each unsupervised pretraining sample in the set of unsupervised pretraining samples includes audio data characterizing an utterance not paired with any ground-truth label.

In some implementations, the operations further include obtaining a mined set of accented speech utterances based on accent representations predicted by the trained accent recognition model from input audio features in a supervised training sample set, and fine-tuning a speech model on the mined set of accented speech utterances. In these implementations, the speech model may include an end-to-end speech recognition model. Here, the speech model may include a transducer-based architecture. Alternatively, the speech model may include a voice conversion model. In some examples, the stack of multi-head attention layers includes a stack of transformer layers or a stack of conformer layers. In some implementations, the stack of multi-head attention layers includes twenty (20) multi-head attention layers.

In some implementations, training the accent recognition model includes, during a supervised training stage, performing supervised cross entropy loss training with distributionally robust optimization to reduce accent recognition accuracy variance between different accents in the corpus of training utterances. Here, the operations also include, during an unsupervised training stage, performing unsupervised clustering to recognize unseen accents. In these implementations, performing unsupervised clustering includes applying K-means algorithm to update centroids of the corresponding accent representations output from the pooling layer.

Another aspect of the disclosure provides a system for clustering and mining accented speech for inclusive and fair speech recognition in an automatic speech recognition (ASR) system. The system includes data processing hardware and memory hardware in communication with the data processing hardware. The memory hardware stores instructions that when executed on the data processing hardware causes the date processing hardware to perform operations including receiving a corpus of training utterances spoken across various accents. Each training utterance in the corpus includes training audio features characterizing the training utterance. The operations also include executing a training process to train an accent recognition model on the corpus of training utterances to teach the accent recognition model to learn how to predict accent representations from the training audio features. The accent recognition model includes one or more strided convolution layers, a stack of multi-headed attention layers, and a pooling layer. The one or more strided convolutional layers are configured to subsample the training audio features of each training utterance and output a strided convolution output. The stack of multi-head attention layers are configured to receive each strided convolution output from the strided convolutional layers. The pooling layer is configured to pool, from a last multi-head attention layer in the stack of multi-head attention layers, an output for each training utterance across time to generate a corresponding accent representation.

This aspect may include one or more of the following optional features. In some implementations, the operations further include, prior to training the accent recognition model, pretraining the accent recognition model by training an end-to-end speech recognition model on a set of supervised pretraining samples. Each supervised pretraining sample in the set of supervised pretraining samples includes audio data characterizing an utterance paired with a ground-truth transcription of the utterance. Here, the end-to-end speech recognition model includes an audio encoder and a decoder. In these implementations, the pretrained accent recognition model is initialized from the audio encoder after training the end-to-end speech recognition model. In these implementations, the end-to-end speech recognition model may include a transducer-based architecture. Additionally or alternatively, the audio encoder of the end-to-end speech recognition model includes a same architecture as the accent recognition model. The set of supervised pretraining samples may contain utterances spanning various accents. In some examples, the operations further include, prior to training the accent recognition model, pretraining the accent recognition model on a set of unsupervised pretraining samples. In these examples, each unsupervised pretraining sample in the set of unsupervised pretraining samples includes audio data characterizing an utterance not paired with any ground-truth label.

In some implementations, the operations further include obtaining a mined set of accented speech utterances based on accent representations predicted by the trained accent recognition model from input audio features in a supervised training sample set, and fine-tuning a speech model on the mined set of accented speech utterances. In these implementations, the speech model may include an end-to-end speech recognition model. Here, the speech model may include a transducer-based architecture. Alternatively, the speech model may include a voice conversion model. In some examples, the stack of multi-head attention layers includes a stack of transformer layers or a stack of conformer layers. In some implementations, the stack of multi-head attention layers includes twenty (20) multi-head attention layers.

In some implementations, training the accent recognition model includes, during a supervised training stage, performing supervised cross entropy loss training with distributionally robust optimization to reduce accent recognition accuracy variance between different accents in the corpus of training utterances. Here, the operations also include, during an unsupervised training stage, performing unsupervised clustering to recognize unseen accents. In these implementations, performing unsupervised clustering includes applying K-means algorithm to update centroids of the corresponding accent representations output from the pooling layer.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 3A and 3B are schematic views of an example training process for promoting an accent recognition model to learn consistent predictions.

FIG. 6 is a schematic view of an example arrangement of operations for a method of training an accent recognition model.

Like reference symbols in the various drawings indicate like elements.

DETAILED DESCRIPTION

End-to-end (E2E) automatic speech recognition (ASR) models are traditionally structured to operate in either a streaming mode or a non-streaming mode. Conventionally, an E2E ASR model includes an encoder and a decoder as the main components. Moreover, conventional ASR systems are typically trained on large (i.e., more than tens of thousands) of hours of speech data. However, the distribution of speech data used for training ASR systems is often biased toward common accents (e.g., US, Canadian, English, etc.) and typical speech patterns rather than under-represented accented speech (e.g., Irish, Asian, Australian, etc.). This bias in the speech data used to train the ASR systems may further result in the ASR systems performing poorly during inference when recognizing atypical accented speech. Moreover, manually collecting accented speech data to fairly train ASR systems is time consuming and expensive.

Implementations herein are directed toward a single E2E ASR model that is trained on speech data clustered and mined by an accent recognition model. The mined data improves training of the ASR model where under-represented training samples are limited and/or corrupted. Rather than manually collecting and verifying accented speech data, implementations herein are directed toward a systematic data filtering/mining process performed by an accent recognition model that is trained to predict accent representations from audio features of training utterances. Here, clustering and mining accent representations suitable for training improves the recognition quality of atypical accented speech resulting in an ASR model that performs inclusive and fair speech recognition. To overcome the limited size of supervised accent data as well as unreliable accent labels, the accent recognition model may be pre-trained with supervised training data (e.g., labeled data) or unsupervised training data to prevent the accent recognition model from learning features (e.g., speaker gender, tone, etc.) that are not relevant to accent recognition. Further, the accent recognition model is trained in a two-stage training process including a first training stage that uses supervised distributionally robust optimization (DRO) to minimize the empirical risk of the worst-performing accent group to reduce accuracy variance between accents, and a second stage using unsupervised clustering that applies a K-means algorithm to recognize unseen accents while training the accent recognition model. Thereafter, the trained accent recognition model is used to filter/mine training data to train the ASR model.

Figure 1:
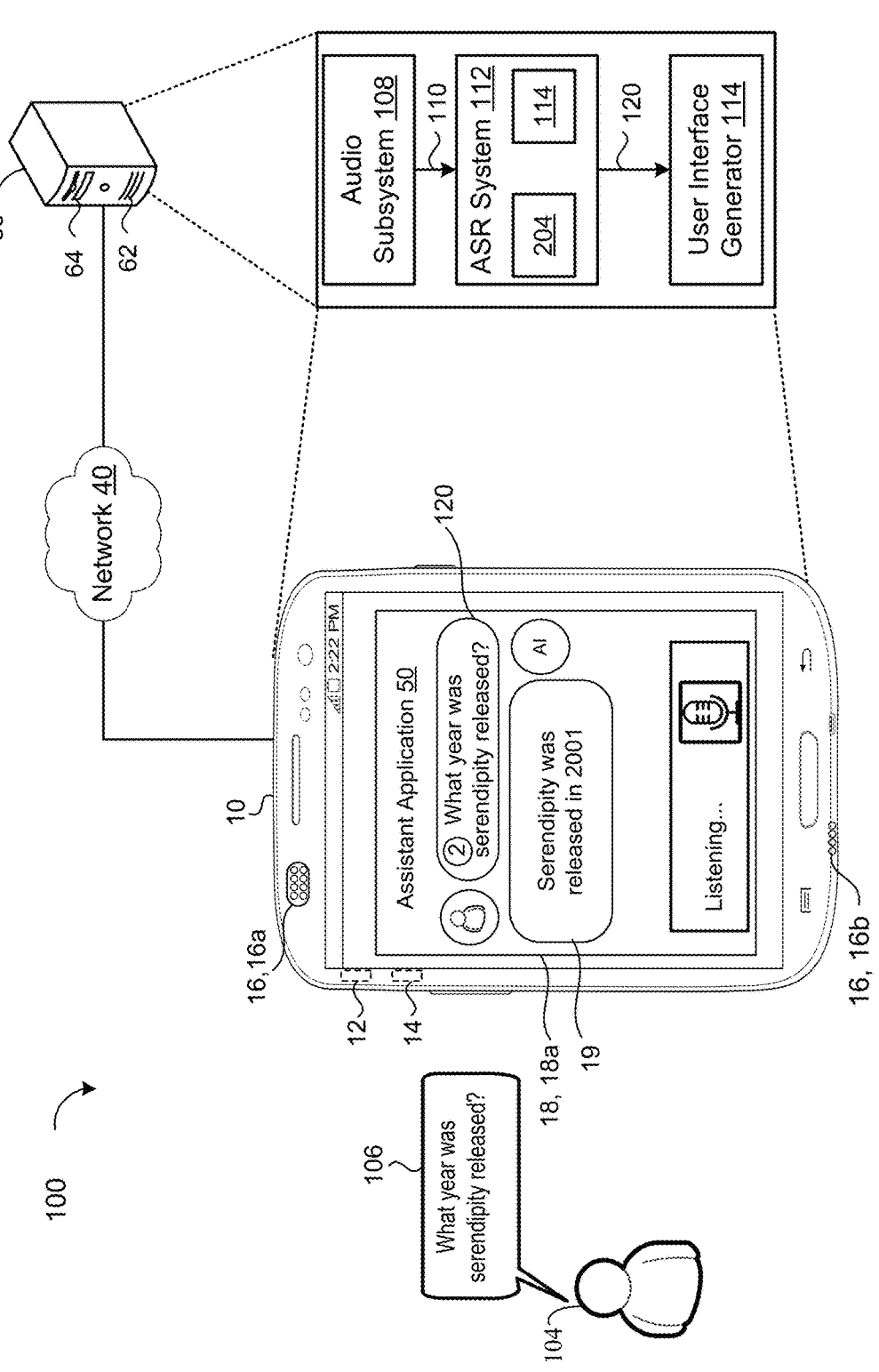
FIG. 1 is a schematic view of an example speech environment using a speech recognition model, the speech recognition model fine-tuned using an accent recognition model trained to cluster and mine accented speech.

FIG. 1 is an example of a speech environment 100. In the speech environment 100, a user's 104 manner of interacting with a computing device, such as a user device 10, may be through voice input. The user device 10 (also referred to generally as a device 10) is configured to capture sounds (e.g., streaming audio data) from one or more users 104 within the speech environment 100. Here, the streaming audio data may refer to a spoken utterance 106 by the user 104 that functions as an audible query, a command for the device 10, or an audible communication captured by the device 10. Speech-enabled systems of the device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., micro-phone) 16, 16a for capturing and converting spoken utter-ances 106 within the speech environment 100 into electrical signals and a speech output device (e.g., a speaker) 16, 16b for communicating an audible audio signal (e.g., as output audio data from the device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

In the speech environment 100, an automated speech recognition (ASR) system 112 implementing an ASR model 114 (also referred to as a speech model 114) and an accent detection model 204. The ASR system 112 resides on the user device 10 of the user 104 and/or on a remote computing device 60 (e.g., one or more remote servers of a distributed system executing in a cloud-computing environment) in communication with the user device 10 via a network 40. The remote computing device 60 may include remote resources, such as remote data processing hardware 62 (e.g., remote servers or CPUs) and/or remote memory hardware 64 (e.g., remote databases or other storage hardware). The user device 10 and/or the remote computing device 60 also includes an audio subsystem 108 configured to receive the utterance 106 spoken by the user 104 and captured by the audio capture device 16a, and to convert the utterance 106 into a corresponding digital format associated with input acoustic frames 110 capable of being processed by the ASR system 112. In the example shown in FIG. 1, the user 104 speaks a respective utterance 106 and the audio subsystem 108 converts the utterance 106 into corresponding audio data (e.g., acoustic frames) 110 for input to the ASR system 112. Thereafter, the ASR model 114 receives, as input, the audio data 110 corresponding to the utterance 106, and generates/predicts, as output, a corresponding transcription 120 (also referred to as a recognition result/hypothesis 120) of the utterance 106.

In some implementations the ASR model 114 is a single model that can operate in streaming and non-streaming mode (e.g., in contrast with two separate models where each model is dedicated to either a streaming mode or non-streaming mode). For instance, as shown in FIG. 1, a digital assistant application 50 executing on the user device 10 may require the speech recognition to be streaming such that words, word pieces, and/or individual characters appear on the screen as soon as they are spoken. Additionally, it is also likely that the user 104 of the user device 10 has a low tolerance for latency when issuing queries for the digital assistant application 50 to perform. In these scenarios where the application demands minimal latency, the ASR model 114 operates in a streaming mode where the model 200 may provide streaming transcription capabilities in real-time as the user 104 is speaking the utterance 106. On the other hand, when the user 104 has a higher tolerance for speech recognition latency and/or the utterance 106 to be recog-nized is associated with long-form speech (i.e., referring to speech consisting of full paragraphs or multiple sentences), the same ASR model 114 may operate in a non-streaming mode and may leverage a prediction network to provide an accurate transcription 120, but incur increased latency.

Figure 2:
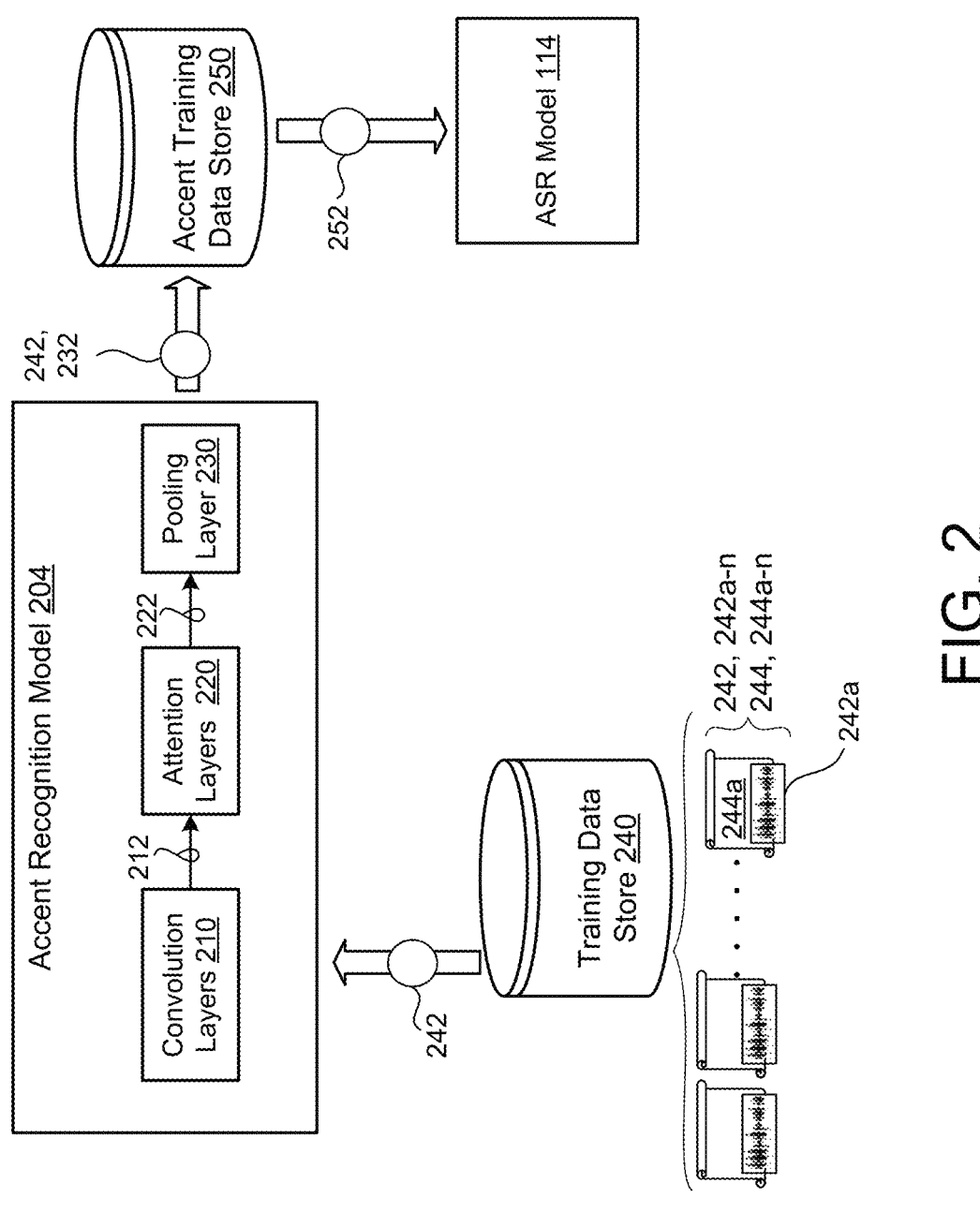
FIG. 2 is a schematic view an example training process for fine-tuning the speech recognition model of FIG. 1.

Additionally, the user 104 requires that the ASR system 112 of the user device 10 is able to accurately identify both common speech and accented speech. Referring to FIGS. 1 and 2, Rather than training the ASR model 114 on an entire corpus of training utterances 242 that may include an uneven distribution of types of accented speech, the ASR model 114 is trained using clustered and mined accented speech utter-ances 252 based on accent representations 232 predicted by the accent recognition model 204. As such, the trained ASR model 114 performs equally well on under-represented accented speech patterns and common accented speech patterns. As described in greater detail below with reference to FIG. 2, the ASR model 114 may be fine-tuned in a training process that obtains a mined set of accented speech utter-ances 252 based on accent representations 232 predicted by the trained accent recognition model 204. By being trained on the mined set of accented speech utterances 252, the ASR model 202 performs inclusive and fair speech recognition despite the imbalance of accented speech in the larger set of training utterances 242. Accordingly, the ASR system 112 may implement the ASR model 114 to accurately predict the transcription 120 regardless of whether the utterance 106 includes accented or common speech.

The user device 10 and/or the remote computing device 60 also executes a user interface generator 107 configured to present a representation of the transcription 120 of the utterance 106 to the user 104 of the user device 10. In some configurations, the transcription 120 output from the ASR system 112 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription 120 into synthesized speech for audible output by the user device 10 and/or another device.

In the example of FIG. 1, the user 104 in the speech environment 100 interacts with a program or application 50 (e.g., the digital assistant application 50*a*) of the user device 10 that uses the ASR system 112. For instance, FIG. 1 depicts the user 104 communicating with the digital assistant application 50 and the digital assistant application 50 displaying a digital assistant interface 18 on a screen of the user device 10 to depict a conversation between the user 10 and a digital assistant of the digital assistant application 50. In this example, the user 104 asks the digital assistant application 50, "What year was Serendipity released?" This question from the user 104 is a spoken utterance 106 captured by the audio capture device 16*a* and processed by audio systems 16 of the user device 10. In this example, the audio system 16 receives the spoken utterance 106 and converts it into acoustic frames 110 for input to the ASR system 112.

Continuing with the example, the ASR model 114, while receiving the acoustic frames 110 corresponding to the utterance 106 as the user 104 speaks, encodes the acoustic frames 110 and then decodes an encoded representation of the acoustic frames 110 into the speech recognition results 120. Thereafter, the user interface generator 107 presents, via the digital assistant interface 18, a representation of the speech recognition results 120 of the utterance 106 to the user 104 of the user device 10. In this example, the user 104 may speak in an under-represented accent, such that a standard ASR model may predict an incorrect transcription of the utterance 106. However, because the ASR model 114 is trained using the mined set of accented speech utterances 252 based on accent representations 232 predicted by the trained accent recognition model 204, the ASR model 114 accurately predicts that the utterance 106 is "what year was serendipity released?" In some implementations, the ASR system 112 executes the accent recognition model 204 during inference of the ASR model 114 to detect an accent of the utterance 106 by predicting an accent representation 232 for the utterance 106. In these implementations, the accent representation 232 of the utterance 106 may be included with the utterance 106 as input to the ASR model 114 performing speech recognition on the utterance 106.

In the example shown in FIG. 1, the digital assistant application 50 may respond to the question posed by the user 104 using natural language processing. Natural language processing generally refers to a process of interpreting written language (e.g., the speech recognition results 120) and determining whether the written language prompts any action. In this example, the digital assistant application 50 uses natural language processing to recognize that the question from the user 10 regards the user's environment and more particularly a song playing in the user's vicinity. By recognizing these details with natural language processing, the automated assistant returns a response 19 to the user's query where the response 19 states, "Serendipity was released in 2001." In some configurations, natural language processing occurs on the remote computing device 60 in communication with the data processing hardware 12 of the user device 10.

Figure 3A:
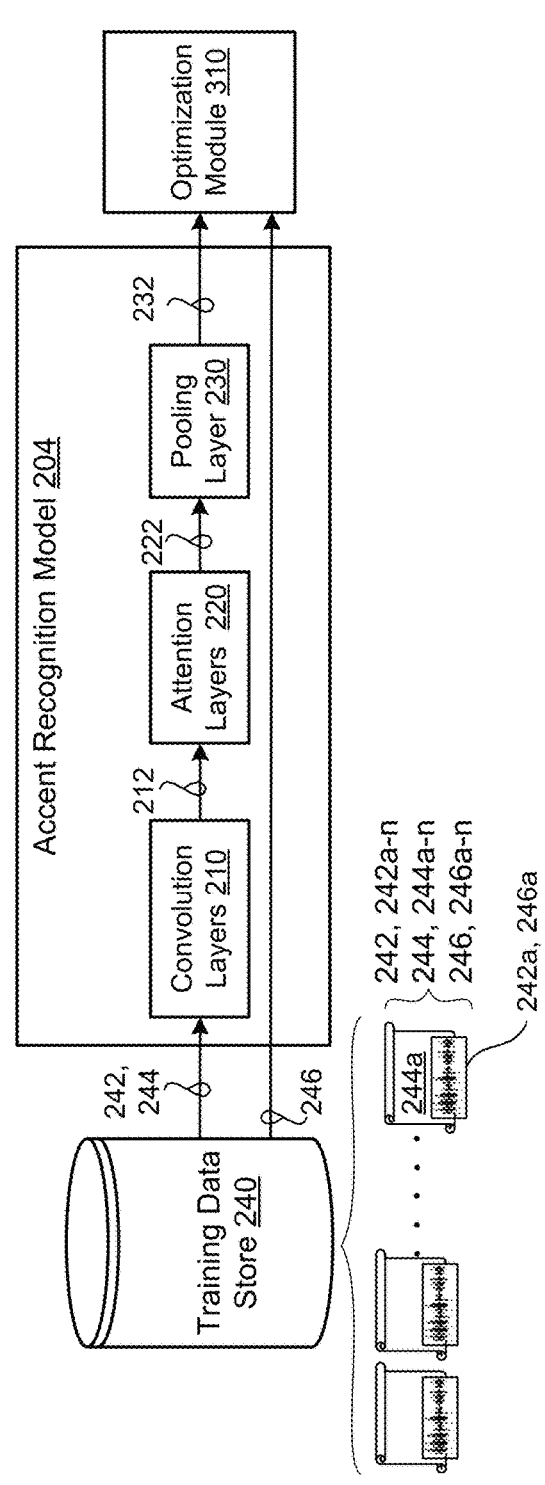

With reference to FIGS. 2-3B, the accent recognition model 204 is trained to predict the accent representations 232 from the training audio features 244 in a two-stage training process 300, 300*a-b*. Once trained, the accent recognition model 204 is used to train the ASR model 114. The training process 300 includes a supervised first training stage 300*a* (FIG. 3A) and an unsupervised second training stage 300*b* (FIG. 3B). As shown, the accent recognition model 204 has access to a training data store 240 stored on the remote memory hardware 64 of the remote computing system 60. In some implementations, the training process 300 is executed on the remote computing system 60.

The training data store 240 includes a corpus of training utterances 242, 242*a-n* that are spoken across various accents. Each training utterance 242 in the data store 240 includes corresponding training audio features 244, 244*a-n* characterizing the training utterance 242, and a ground-truth label 246, 246*a-n*. For example, the training data store 240 may include 220,000 utterances 242 in US accents, 73,000 utterances 242 in Indian accents, 75,000 utterances 242 in English accents, 39,000 utterances 242 in Canadian accents, 31,000 utterances 242 in Australian accents, 9,820 utterances 242 in Asian accents, 5,867 utterances 242 in Irish accents, and 9,864 utterances 242 in Scottish accents. Notably, not only do nearly one half ($\frac{1}{2}$) of all of the utterances 242 in the training data store 240 include US accents, but the second largest group of utterances 242 (i.e., English accents) is only roughly one third ($\frac{1}{3}$) of the utterances 242 in US accents.

The accent recognition model 204 includes one or more convolution layers 210, a stack of multi-headed attention layers 220, and a pooling layer 230. The one or more convolution layers 210 are configured to sub-sample the training audio features 244 of each training utterance 242 and output a strided convolution output 212. For instance, the one or more convolution layers 210 may include one or more strided convolution layers 210 that sub-sample log-mel spectrograms (e.g., the audio features 244) of the training utterances 242 with a stride of four (4). The one or more strided convolution layers 210 may include two (2) 2-dimensional convolution layers.

The stack of multi-headed attention layers 220 is configured to receive each strided convolution output 212 output from the strided convolution layers 210 and may include twenty (20) multi-headed attention layers 220. Optionally, the stack of multi-headed attention layers includes a stack of transformer layers or a stack of conformer layers. Here, an initial multi-headed attention layer 220 receives the strided convolution output 212 output from the strided convolution layers 210 and generates a corresponding output representation 222 received as input by the next multi-headed attention layer 220. In some implementations, the multi-headed attention layers 220 are based on a bi-directional transformer architecture. The pooling layer 230 is configured to pool, from a last multi-headed attention layer 220 in the stack of multi-headed attention layers 220, an output 222 for each training utterance 242 across time to generate a corresponding accent representation 232 for the training utterance 242. For instance, at each timestep, the last multi-headed attention layer 220 outputs an attention layer output 222, where the pooling layer 230 receives each output 222 over the time of the training utterance 242, and applies average pooling across time to generate the accent representation 232.

Referring to FIG. 3A, the supervised first training stage 300, 300*a* performs supervised cross entropy loss training with distributionally robust optimization (DRO) to reduce accent recognition accuracy variance between different accents in the corpus of training utterances 242. As shown, the accent recognition model 204 receives the corpus of training utterances 242 spoken across various accents, and, based on the training audio features 244, generates a corresponding accent representation 232 for each training utterance 242. An optimization module 310 of the supervised training stage 300a receives, as input, the predicted accent representation 232 and the corresponding ground-truth label 246 of the training utterance 242 and determines a training loss based on the predicted accent representation 232 and the corresponding ground-truth label 246. The optimization module 310 then tracks the loss for each accent group in the predicted accent representations 232, and scales the losses from each accent group by minimizing the empirical risk of the worst-performing accent group rather than minimizing the average empirical risk. Here, the optimization module 310 prevents the accent recognition model 204 from learning correlations between input training audio features 244 and output targets that hold on average, but do not generalize broadly. Put differently, the optimization module 310 scales the loss from the worst performing accent group more to prevent the accent recognition model 204 from further optimizing on the worst performing accent groups even when the corresponding losses from the worst performing accent groups are small.

Referring to FIG. 3B, the unsupervised second training stage 300, 300b performs unsupervised clustering to recognize unseen accents (i.e., accents not included in the corpus of training utterances 242). As shown, a clustering module 320 of the training stage 300b applies a K-means algorithm to initialize and update centroids of the corresponding accent representations 232 output from the pooling layer 230 of the accent recognition model 204. The number of K-means centroids may be flexibly large enough to include unseen accents (i.e., accents not included in the training utterances 242). Here, after the pooling layer 230 outputs the predicted accent representations 232, the clustering module 320 may initialize the centroids of the accent representations 232 in a t-distributed stochastic neighbor embedding (T-SNE) plot by randomly selecting a data point $x \in X$ as a first centroid $c_1$. Each new centroid $c_i$ after the first centroid $c_1$ is then sampled based on a distance probability:

$$\frac{D(x)^2}{\sum_{x \in X} D(x)^2} \quad (1)$$

where $D(x)$ denotes the distance to the closest centroid from data x. This sampling is continued until all the centroids in the corresponding accent representations 232 output from the pooling layer 230 are initialized.

After each of the centroids are initialized, the clustering module 320 may update each centroid of the corresponding accent representations 232 output from the pooling layer 230 by computing new centroids, as follows:

$$\hat{c}_i = \frac{1}{|C_i|} \sum_{x \in C_i} x \quad (2)$$

where $C_i$ denotes the set of data points (i.e., the accent representations 232) belonging to the centroid $c_i$ 410, and $|C_i|$ denotes the cardinality of the set of data points. The exponentially moving average is then updated by:

$$c_i^t = \alpha c_i^{t-1} + (1 - \alpha)\hat{c}_i \quad (3)$$

where $\alpha$ denotes the exponentially moving average update weight. Notably, the K-means algorithm only updates the locations of the centroids 410, without updating the trained accent recognition model 204.

Figure 5A:
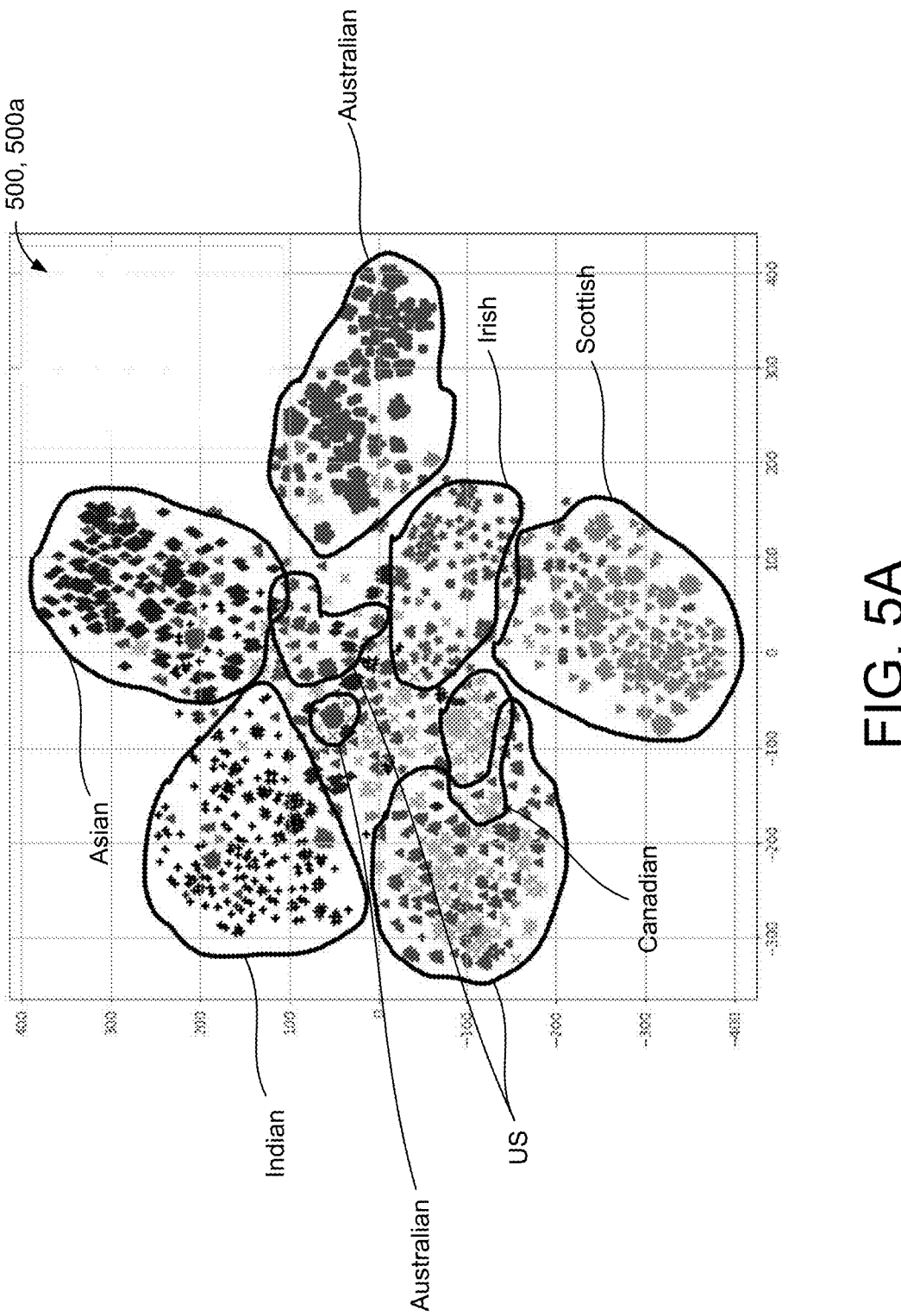
FIGS. 5A-5C are example plots of clustered accent representations.
Figure 5B:
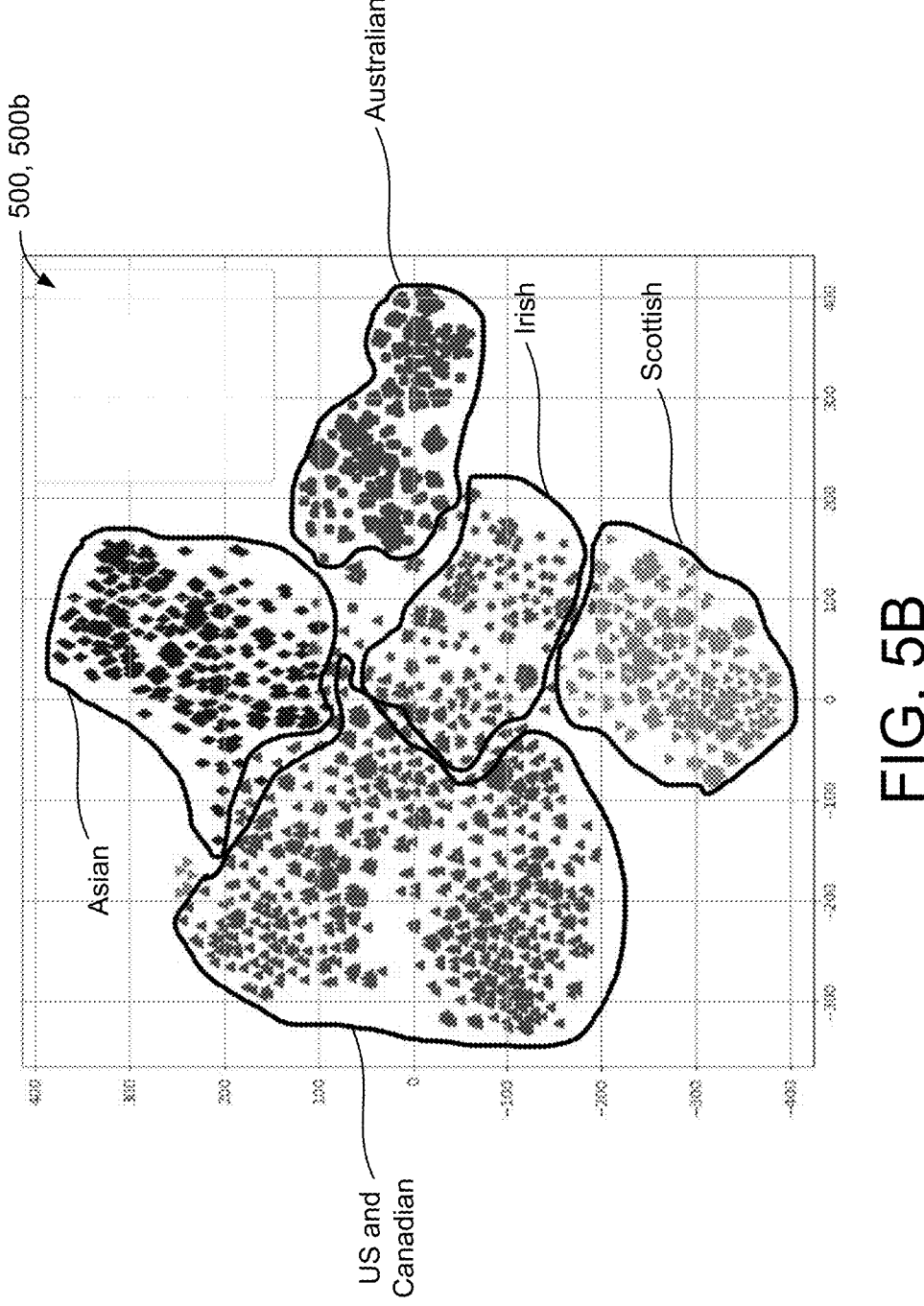
Figure 5C:
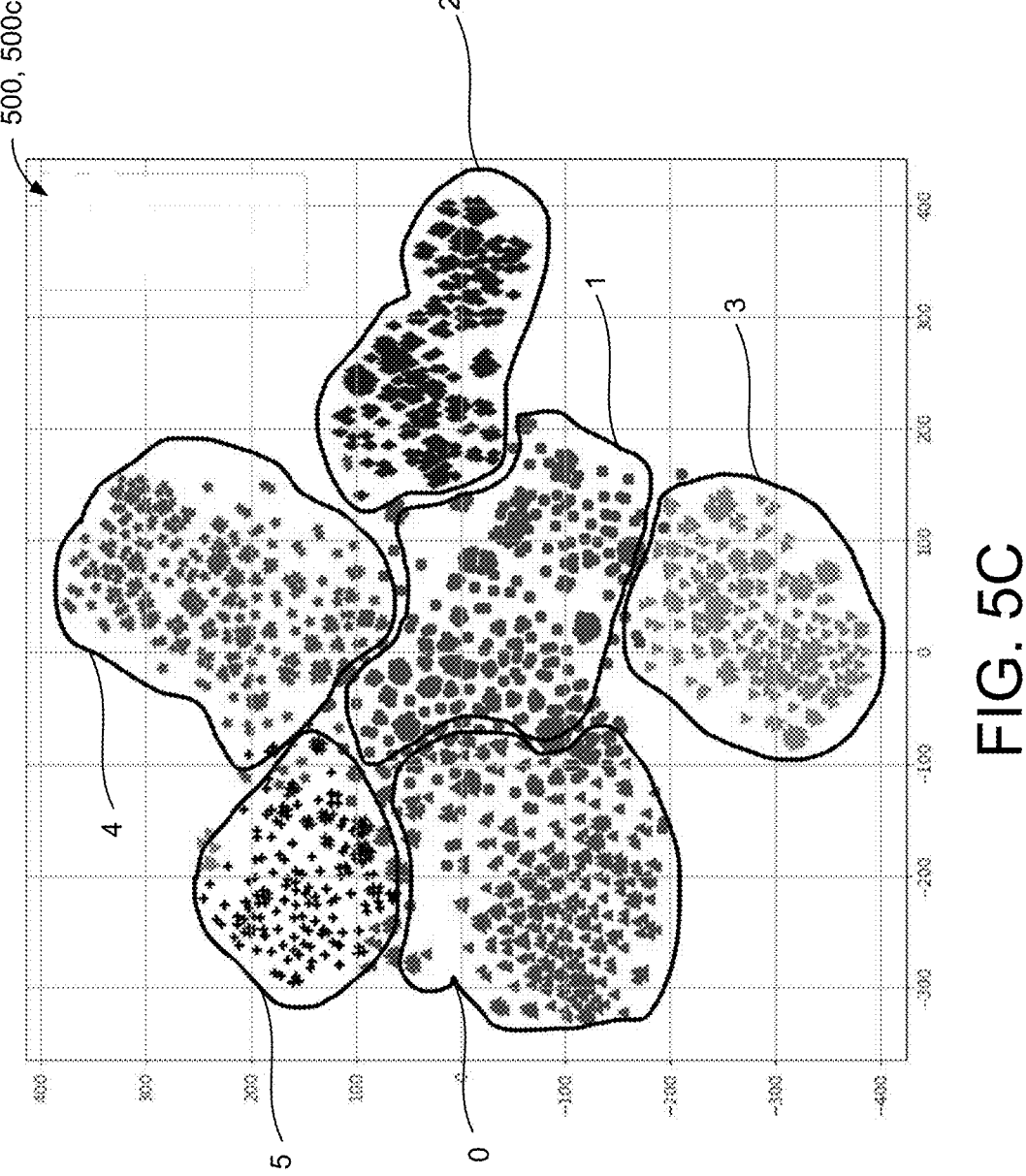

Referring to FIGS. 5A-5C, TNSE plots 500, 500a-c are shown where each TNSE plot 500 includes different clustering on the same set of training utterances 242. Here, the accent groups in the TNSE plots 500 include US, Canadian, Australian, Asian, Scottish, Irish, and Indian. Notably during the supervised first training stage 300a, the accent recognition model 204 is not trained on the training utterances 242 representing the Indian accent group to test the generalization capability of the accent recognition model 204.

Referring to FIG. 5A, the TNSE plot 500a clusters groups of accent representations 232 by their corresponding ground-truth labels 246. For instance, the TNSE plot 500a includes a group of accent representations 232 including US, Canadian, Australian, Asian, Scottish, Irish, and Indian accents. As shown, the US accent group and the Canadian accent group generally overlap, and as such are treated as the same during the training process 300. Moreover, the US, Asian, and Irish accent groups are mixed in the center of the TNSE plot 500a without clear boundaries due to the ground-truth labels 246 of the training utterances 242 including noisy accent labels that incorporate the location of the speakers.

Referring to FIG. 5B, the TNSE plot 500b clusters groups of accent representations 232 based on the predictions of the accent recognition model 204. For example, the TNSE plot 500b includes a group of accented representations 232 for US and Canadian combined, Australian, Asian, Scottish, and Irish accent groups. Notably, because the model 204 was not trained with training utterances 242 of the Indian accent group, the model 204 does not correctly recognize Indian accents.

Referring to FIG. 5C, the TNSE plot 500c shows K-means clustering performed by the clustering module 320. As shown, the TNSE plot 500c includes six (6) cluster groups corresponding to six (6) centroids. Unlike the TNSE plot 500a, which included mixed accent groups due to noisy ground-truth labels 246, the TNSE plot 500c correctly recognizes the accented representations including the unseen accents (i.e., the Indian accents) that the accent recognition model 204 is not trained on.

Figure 4:
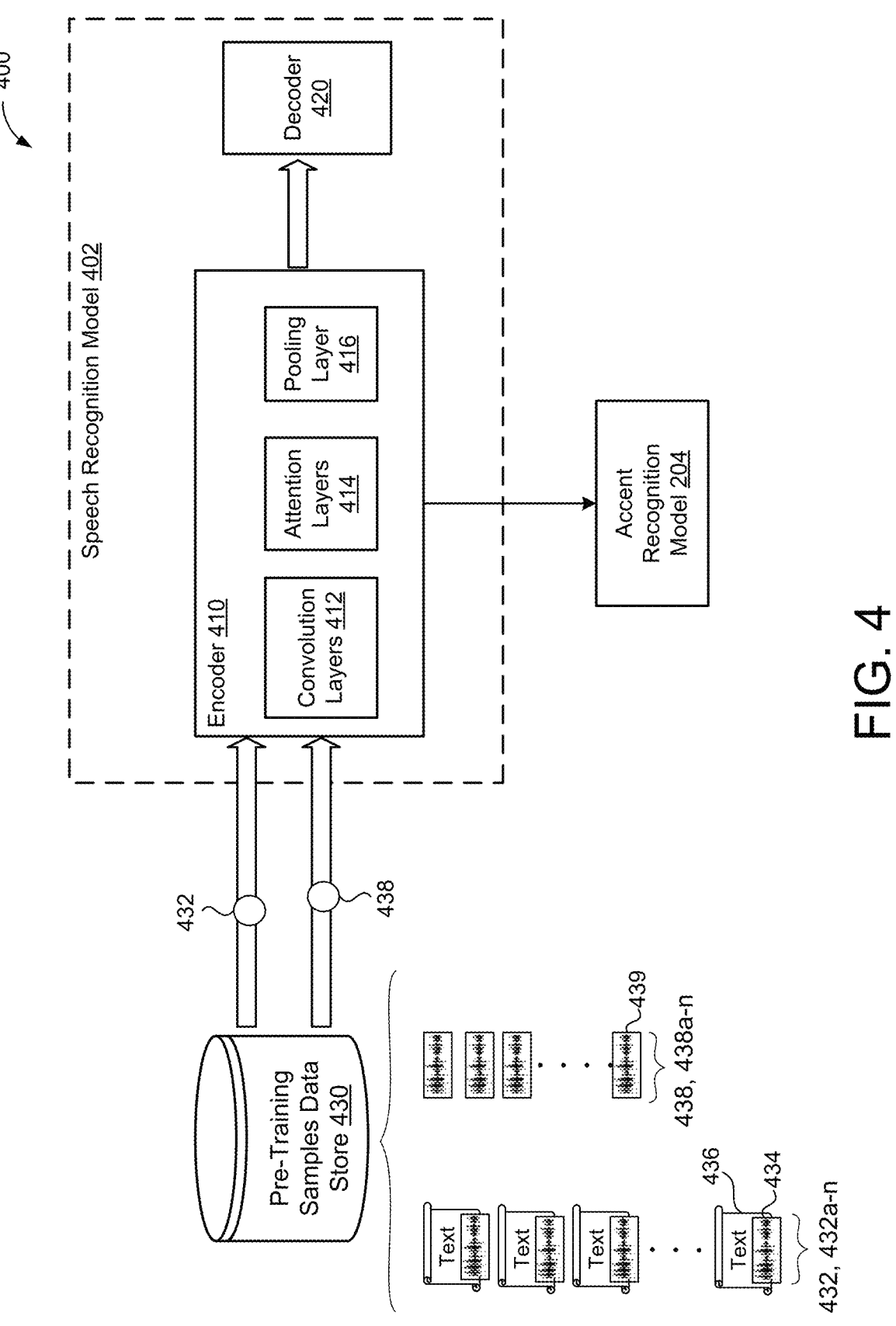
FIG. 4 is a schematic view of a pretraining process of the accent recognition model of FIG. 1.

With reference to FIG. 4, in addition to the training process 300, the accent recognition model 204 may be pre-trained in a pretraining process 400 to prevent the accent recognition model 204 from correlating features other than speech accents to the predicted accent representations 232. As shown, the pretraining process 400 has access to a pretraining samples data store 430 stored on the remote memory hardware 64 of the remote computing system 60. In some implementations, the pretraining process 400 is executed on the remote computing system 60. The pretraining samples data store 430 includes a set of supervised pretraining samples 432, 432a-n, and a set of unsupervised pretraining samples 438, 428a-n, the sets of pretraining samples 432, 438 containing utterances spanning various accents. Each supervised pretraining sample 432 in the data store 430 includes audio data 434 characterizing an utterance paired with a ground-truth transcription 246 of the utterance, and each unsupervised pretraining sample 438 in the data store 430 including audio data 439 characterizing an utterance and not paired with any ground-truth label.

In implementations where the pretraining process 400 is supervised, the pretraining process 400 samples a set of the supervised pretraining samples 432 and trains an end-to-end speech recognition model 402 on the set of supervised pretraining samples 432. In these implementations, the end-to-end speech recognition model 204 may include an audio encoder 410 and a decoder 420, where the pretrained accent recognition model 204 is initialized from the audio encoder 420 after training the end-to-end speech recognition model 402. In these implementations, the end-to-end speech recognition model 402 may include a transducer-based architecture. In some implementations, the audio encoder 420 of the end-to-end speech recognition model 402 includes a same architecture as the accent recognition model 204. For instance, as shown in FIG. 4, the audio encoder 420 of the end-to-end speech recognition model 402 includes one or more (e.g., two) strided convolution layers 412, one or more (e.g. twenty) multi-headed attention layers 414, and a pooling layer 416. Alternatively, the pretraining process 400 is unsupervised. Here, the pretraining process samples a set of the unsupervised pretraining samples 438 and trains the accent recognition model 204 on the set of unsupervised pretraining samples 438

Referring again to FIG. 2, after the accent recognition model 204 is trained, it is used in a data selection pipeline 200 for training the ASR model 114 of the ASR system 112. As noted above, large training data sets, such as training utterances 242, 242a-n (stored in a training data store 240) may include a severely imbalanced distribution of different accents within the training utterances 242, such that ASR models trained on the training utterances 242 perform poorly when recognizing utterances in uncommon accents. To resolve this, the data selection pipeline 200 may process the corpus of training utterances 242 using the accent recognition model 204 to predict accent representations 232 based on the training audio features 244.

As shown, the data selection pipeline 200 obtains a mined set of accented speech utterances 252 stored in an accent training data store 250 stored on the remote memory hardware 64 of the remote computing system 60. The accented speech utterances 252 are based on accent representations 232 predicted by the trained accent recognition model 204 from input audio features in a supervised training sample set. For example, after the accent recognition model 204 is trained by the training process 300, it may obtain a set of the training utterances 242 including the training audio features 244 and generate predicted accent representations 232. The predicted accent representations 232 may be clustered and stored in the accent training data store 250 for mining by the data selection pipeline 200. As shown, the data selection pipeline obtains the mined set of accented speech utterances 252, and fine-tunes the ASR model 114 on the mined set of accented speech utterances 114 to improve speech recognition on traditionally under-represented accented speech. In these implementations, the ASR model 114 may include an end-to-end speech recognition model. For instance, the end-to-end speech recognition model may include a transducer-based architecture. Alternatively, the ASR model 114 may include a voice conversion model.

While FIG. 2 shows the data selection pipeline 200 employing the accent recognition model 204 during training of the ASR model 114, the accent recognition model 204 may further be used during inference of the ASR model 114. In these implementations, the accent recognition model 204 generates an accent representation 232 of a received utterance such that the accent representation 232 is included with the audio frames 110 as input to the ASR model 114 performing speech recognition on an utterance 106.

FIG. 6 includes a flowchart of an example arrangement of operations for a method 600 of training an accent recognition model 204 to learn how to predict accent representations 232 from training audio features. The method 600 may be described with reference to FIGS. 1-5. Data processing hardware (e.g., data processing hardware 62 of FIG. 1) may execute instructions stored on memory hardware (e.g., memory hardware 64 of FIG. 1) to perform the example arrangement of operations for the method 600.

The method 600 includes, at operation 602, receiving a corpus of training utterances 242 spoken across various accents. Each training utterance 242 in the corpus includes training audio features 244 characterizing the training utterance 242. At operation 604, the method 600 also includes executing a training process 300 to train an accent recognition model 204 on the corpus of training utterances 242 to teach the accent recognition model 204 to learn how to predict accent representations 232 from the training audio features 244. The accent recognition model 204 includes one or more strided convolution layers 210, a stack of multi-headed attention layers 220, and a pooling layer 230. The one or more strided convolution layers 210 are configured to sub-sample the training audio features 244 of each training utterance 242 and output a strided convolution output 212. The stack of multi-headed attention layers 220 are configured to receive each strided convolution output 212 from the strided convolution layers 210. The pooling layer 230 is configured to pool, from a last multi-headed attention layer 220 in the stack of multi-headed attention layers 220, an output for each training utterance 242 across time to generate a corresponding accent representation 232.

Figure 7:
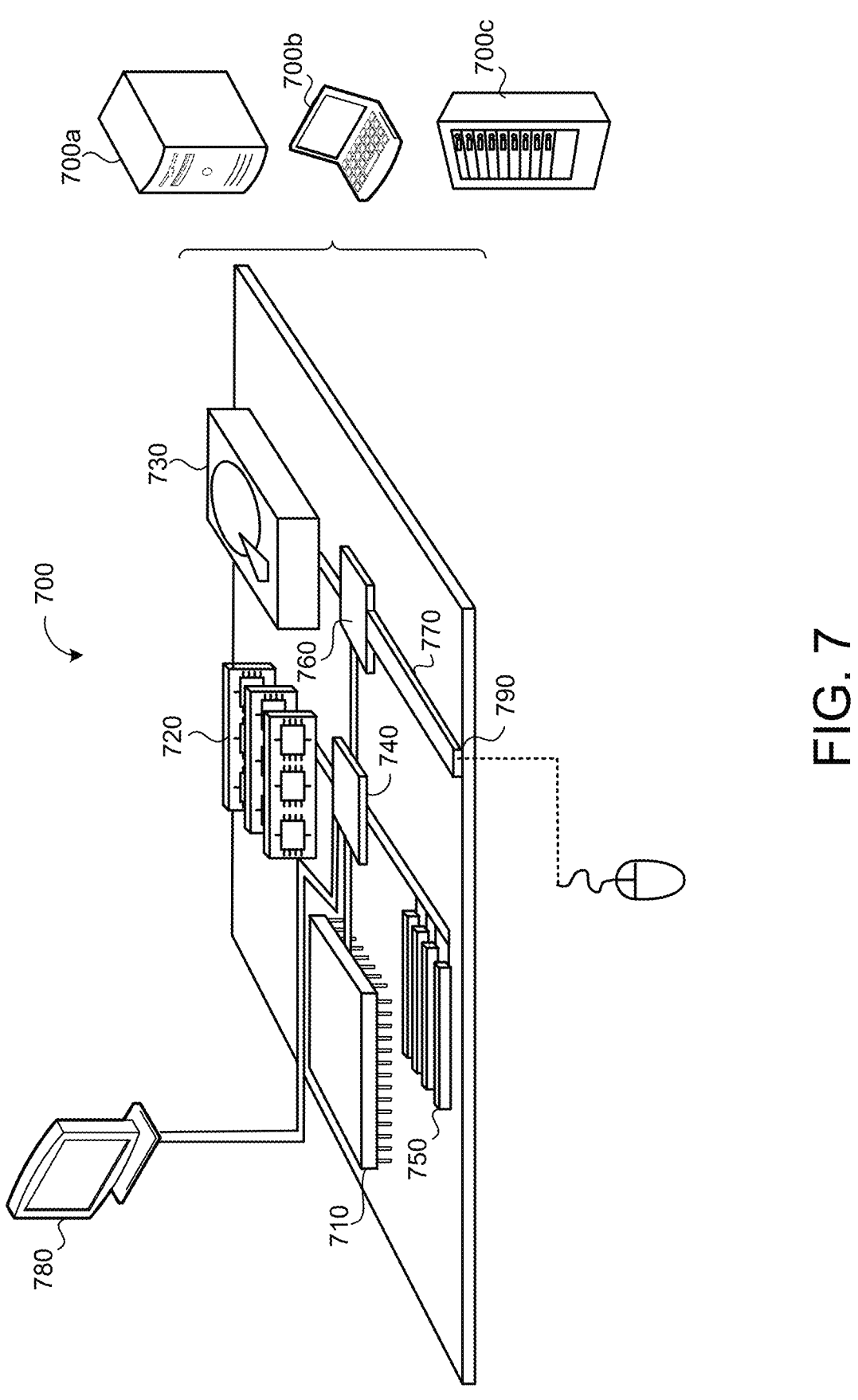
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the implementations described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 (also referred to as "data processing hardware 710" that may include the data processing hardware 12 of the user device 10 or the data processing hardware 62 of the remote computing device 60) can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 (also referred to as "memory hardware 720" that may include the memory hardware 14 of the user computing device 10 or the memory hardware 64 of the remote computing device 60) stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:

receiving a corpus of training utterances spoken across various accents, each training utterance in the corpus comprising training audio features characterizing the training utterance; and executing a training process to train an accent recognition model on the corpus of training utterances to teach the accent recognition model to learn how to predict accent representations from the training audio features, the accent recognition model comprising:

one or more strided convolutional layers configured to sub-sample the training audio features of each training utterance and output a strided convolution output;

a stack of multi-head attention layers configured to receive each strided convolution output from the strided convolutional layers and generate a final attention layer output at a last multi-head attention layer in the stack of multi-head attention layers; and a pooling layer configured to receive the final attention layer output and pool an output for each training utterance across time to generate a corresponding accent representation.

2. The computer-implemented method of claim 1, wherein the operations further comprise, prior to training the accent recognition model, pretraining the accent recognition model by:

training an end-to-end speech recognition model on a set of supervised pretraining samples, each supervised pretraining sample in the set of supervised pretraining samples comprising audio data characterizing an utterance paired with a ground-truth transcription of the utterance, wherein the end-to-end speech recognition model comprises an audio encoder and a decoder, and wherein the pretrained accent recognition model is initialized from the audio encoder after training the end-to-end speech recognition model.

3. The computer-implemented method of claim 2, wherein the end-to-end speech recognition model comprises a transducer-based architecture.

4. The computer-implemented method of claim 2, wherein the audio encoder of the end-to-end speech recognition model comprises a same architecture as the accent recognition model.

5. The computer-implemented method of claim 2, wherein the set of supervised pretraining samples contain utterances spanning various accents.

6. The computer-implemented method of claim 1, wherein the operations further comprise, prior to training the accent recognition model, pretraining the accent recognition model on a set of unsupervised pretraining samples, each unsupervised pretraining sample in the set of unsupervised pretraining samples comprising audio data characterizing an utterance not paired with any ground-truth label.

7. The computer-implemented method of claim 1, wherein the operations further comprise:

obtaining a mined set of accented speech utterances based on accent representations predicted by the trained accent recognition model from input audio features in a supervised training sample set; and fine-tuning a speech model on the mined set of accented speech utterances.

8. The computer-implemented method of claim 7, wherein the speech model comprises an end-to-end speech recognition model.

9. The computer-implemented method of claim 8, wherein the speech model comprises a transducer-based architecture.

10. The computer-implemented method of claim 7, wherein the speech model comprises a voice conversion model.

11. The computer-implemented method of claim 1, wherein the stack of multi-head attention layers comprises a stack of transformer layers or a stack of conformer layers.

12. The computer-implemented method of claim 1, wherein the stack of multi-head attention layers comprises twenty (20) multi-head attention layers.

13. The computer-implemented method of claim 1, wherein training the accent recognition model comprises:

during a supervised training stage, performing supervised cross entropy loss training with distributionally robust optimization to reduce accent recognition accuracy variance between different accents in the corpus of training utterances; and during an unsupervised training stage, performing unsupervised clustering to recognize unseen accents.

14. The computer-implemented method of claim 13, wherein performing unsupervised clustering comprises applying K-means algorithm to update centroids of the corresponding accent representations output from the pooling layer.

15. A system comprising:

data processing hardware; and memory hardware in communication with the data processing hardware and storing instructions that cause the data processing hardware to perform operations comprising:

receiving a corpus of training utterances spoken across various accents, each training utterance in the corpus comprising training audio features characterizing the training utterance; and executing a training process to train an accent recognition model on the corpus of training utterances to teach the accent recognition model to learn how to predict accent representations from the training audio features, the accent recognition model comprising:

one or more strided convolutional layers configured to sub-sample the training audio features of each training utterance and output a strided convolution output;

a stack of multi-head attention layers configured to receive each strided convolution output from the strided convolutional layers and generate a final attention layer output at a last multi-head attention layer in the stack of multi-head attention layers; and a pooling layer configured to receive the final attention layer output and pool an output for each training utterance across time to generate a corresponding accent representation.

16. The system of claim 15, wherein the operations further comprise, prior to training the accent recognition model, pretraining the accent recognition model by:

training an end-to-end speech recognition model on a set of supervised pretraining samples, each supervised pretraining sample in the set of supervised pretraining samples comprising audio data characterizing an utterance paired with a ground-truth transcription of the utterance, wherein the end-to-end speech recognition model comprises an audio encoder and a decoder, and wherein the pretrained accent recognition model is initialized from the audio encoder after training the end-to-end speech recognition model.

17. The system of claim 16, wherein the end-to-end speech recognition model comprises a transducer-based architecture.

18. The system of claim 16, wherein the audio encoder of the end-to-end speech recognition model comprises a same architecture as the accent recognition model.

19. The system of claim 16, wherein the set of supervised pretraining samples contain utterances spanning various accents.

20. The system of claim 15, wherein the operations further comprise, prior to training the accent recognition model, pretraining the accent recognition model on a set of unsupervised pretraining samples, each unsupervised pretraining sample in the set of unsupervised pretraining samples comprising audio data characterizing an utterance not paired with any ground-truth label.

21. The system of claim 15, wherein the operations further comprise:

obtaining a mined set of accented speech utterances based on accent representations predicted by the trained accent recognition model from input audio features in a supervised training sample set; and fine-tuning a speech model on the mined set of accented speech utterances.

22. The system of claim 21, wherein the speech model comprises an end-to-end speech recognition model.

23. The system of claim 22, wherein the speech model comprises a transducer-based architecture.

24. The system of claim 21, wherein the speech model comprises a voice conversion model.

25. The system of claim 15, wherein the stack of multi-head attention layers comprises a stack of transformer layers or a stack of conformer layers.

26. The system of claim 15, wherein the stack of multi-head attention layers comprises twenty (20) multi-head attention layers.

27. The system of claim 15, wherein training the accent recognition model comprises:

during a supervised training stage, performing supervised cross entropy loss training with distributionally robust optimization to reduce accent recognition accuracy variance between different accents in the corpus of training utterances; and during an unsupervised training stage, performing unsupervised clustering to recognize unseen accents.

28. The system of claim 27, wherein performing unsupervised clustering comprises applying K-means algorithm to update centroids of the corresponding accent representations output from the pooling layer.

* * * * *